United States Patent [19]
Firmin

[11] Patent Number: 5,832,760
[45] Date of Patent: Nov. 10, 1998

[54] WHEEL LOCKING DEVICE

[75] Inventor: Herman P. Firmin, Baton Rouge, La.

[73] Assignee: Fred D. Parnell, Jr., Baton Rouge, La.

[21] Appl. No.: 886,585

[22] Filed: Jul. 1, 1997

[51] Int. Cl.$^6$ .................................................. B60R 25/00
[52] U.S. Cl. .................................. 70/226; 70/19; 70/238
[58] Field of Search ..................... 70/14, 18, 19, 70/225, 226, 237, 238

[56] References Cited

U.S. PATENT DOCUMENTS

| | | | |
|---|---|---|---|
| 538,170 | 4/1895 | Kelley | 70/226 |
| 1,218,540 | 3/1917 | Fell | 70/226 |
| 1,488,893 | 4/1924 | Plouffe | 70/226 |
| 2,960,857 | 11/1960 | Winter | 70/19 |
| 3,828,590 | 8/1974 | Thiebault | 70/19 |
| 4,164,131 | 8/1979 | Desmond et al. | 70/14 |
| 4,441,586 | 4/1984 | Bernier | 188/32 |
| 4,768,359 | 9/1988 | Wade | 70/226 X |
| 4,833,442 | 5/1989 | Von Heck | 340/427 |
| 5,134,868 | 8/1992 | Bethards | 70/18 |
| 5,247,815 | 9/1993 | Caldwell | 70/19 |
| 5,315,848 | 5/1994 | Beyer | 70/18 |
| 5,372,018 | 12/1994 | Smith | 70/18 |
| 5,375,442 | 12/1994 | Hammer | 70/226 |
| 5,385,038 | 1/1995 | Walker | 70/14 |
| 5,410,897 | 5/1995 | Edmondson | 70/226 |
| 5,628,212 | 5/1997 | Fritzler | 70/19 |

FOREIGN PATENT DOCUMENTS

| | | | |
|---|---|---|---|
| 992345 | 7/1976 | Canada | 70/19 |

*Primary Examiner*—Suzanne Dino Barrett
*Attorney, Agent, or Firm*—John F. Sieberth; R. Andrew Patty, II

[57] ABSTRACT

Apparatus for clamping a wheel of a wheeled vehicle to prevent or deter theft of the vehicle comprises (a) a first arm and a second arm, each of the arms having a middle portion, a clamping end portion and a locking end portion, the arms being rotatably connected to each other at their respective middle portions; (b) a cross bar having a free end portion and a connecting end portion, the connecting end portion being rotatably connected to the locking end portion of the first arm; (c) a first flange member extending from the locking end portion of the second arm and defining and including a first notch for receiving the free end portion of the cross bar; and (d) a second flange member detachably attachable to the free end portion of the cross bar. The clamping end portions are brought into proximity with one another when the locking end portions are brought into proximity with one another to thereby enable clamping of the wheel. In addition, the first and second flange members and the free end portion of the cross bar can be locked together when (i) the free end portion is received by the first notch and (ii) the second flange member is attached to the free end portion of the cross bar and placed in close proximity to the first flange member.

9 Claims, 3 Drawing Sheets

WHEEL LOCKING DEVICE

TECHNICAL FIELD

This invention relates to clamping devices which prevent or deter the rotation of a wheel on a wheeled vehicle to thereby prevent unauthorized movement of the vehicle.

BACKGROUND

The free market has devise numerous methods for deterring theft of wheeled vehicles such as, e.g., cars, trucks, motorcycles, bicycles, all-terrain vehicles, and the like. Some of these methods depend upon devices which work by clamping a wheel of the vehicle to prevent or deter rotation of the wheel which, in turn, prevents unauthorized movement of the vehicle. However, many such clamping devices are excessively heavy, complicated or otherwise unsuitable for use on some vehicles, e.g., all-terrain vehicles, which may be located in remote wilderness or other places where mud and other debris can hinder performance of the clamping device.

Accordingly, a need exists for a device which serves to deter theft of wheeled vehicles and which is easily installed and removed by those who are authorized to do so, even when the surrounding conditions are such that mud or other debris may be present on various parts of the device.

SUMMARY OF THE INVENTION

This invention is deemed to satisfy the above need in a highly efficient way. In one embodiment, this invention provides apparatus comprising:

a) a first arm and a second arm, each of the arms having a middle portion, a clamping end portion and a locking end portion, the arms being rotatably connected to each other at their respective middle portions;

b) a cross bar having a free end portion and a connecting end portion, the connecting end portion being rotatably connected to the locking end portion of the first arm;

c) a first flange member extending from the locking end portion of the second arm and defining and including a first notch for receiving the free end portion of the cross bar; and d) a second flange member detachably attachable to the free end portion of the cross bar; whereby the clamping end portions are brought into proximity with one another when the locking end portions are brought into proximity with one another to thereby enable clamping of the wheel, and whereby the first and second flange members and the free end portion of the cross bar can be locked together when (i) the free end portion is received by the first notch and (ii) the second flange member is attached to the free end portion of the cross bar and placed in close proximity to the first flange member. Preferably, the free end portion of the cross bar is a threaded free end portion, and the second flange member is comprised of a tab defining and including an internally threaded aperture for receiving the threaded free end portion. It is also preferred that at least one of the flange members has a lock aperture extending therethrough, whereby, when the free end portion of the cross bar is received in the first notch, the second flange member may threadably receive the free end portion of the cross bar and is disposed in proximity to the first flange member so as to enable a lock disposed through the lock aperture to secure the first and second flange members and the free end portion of the cross bar to one another. The clamping end portions of the first and second arms are each preferably arcuate in shape to enable the clamping end portions to surround a wide variety of tires which may be disposed about the rim of the wheel being clamped.

In another preferred embodiment, the clamping end portions of the first and second arms meet at their respective clamping ends when the clamping end portions are brought together, the clamping end of one arm including a cup formed by an annular flange, the cup being sized and configured to receive the clamping end of the other arm when the clamping ends are brought together.

In a particularly preferred embodiment, the second flange member is comprised of (i) a threaded nut having an outer surface, (ii) an arm member having a connecting end and a free end, the arm member being rotatably attached to the outer surface of the nut, at the connecting end, and (iii) a flange portion through which the lock aperture extends, the flange portion extending laterally from the arm member. Also, the first flange member defines and includes a second notch to receive the flange portion of the second flange member when the second flange member is detachably attached to the threaded end portion of the cross bar and the arm member is rotated to place the flange portion in the second notch.

In another embodiment, this invention provides a method of preventing or deterring theft of a wheeled vehicle, the method comprising the steps of:

a) clamping onto a wheel of the vehicle apparatus in accordance with this invention;

b) placing the free end portion of the cross bar in the first notch;

c) attaching the second flange member to the free end portion of the cross bar; and d) locking together the first and second flange members and the free end portion of the cross bar.

These and other embodiments and features of the invention will become still further apparent from the ensuing description, appended claims and accompanying drawings.

BRIEF DESCRIPTION OF THE DRAWINGS

In each of the above figures, like numerals are used to refer to like or functionally like parts among the several figures.

DETAILED DESCRIPTION OF THE INVENTION

Figure 1:
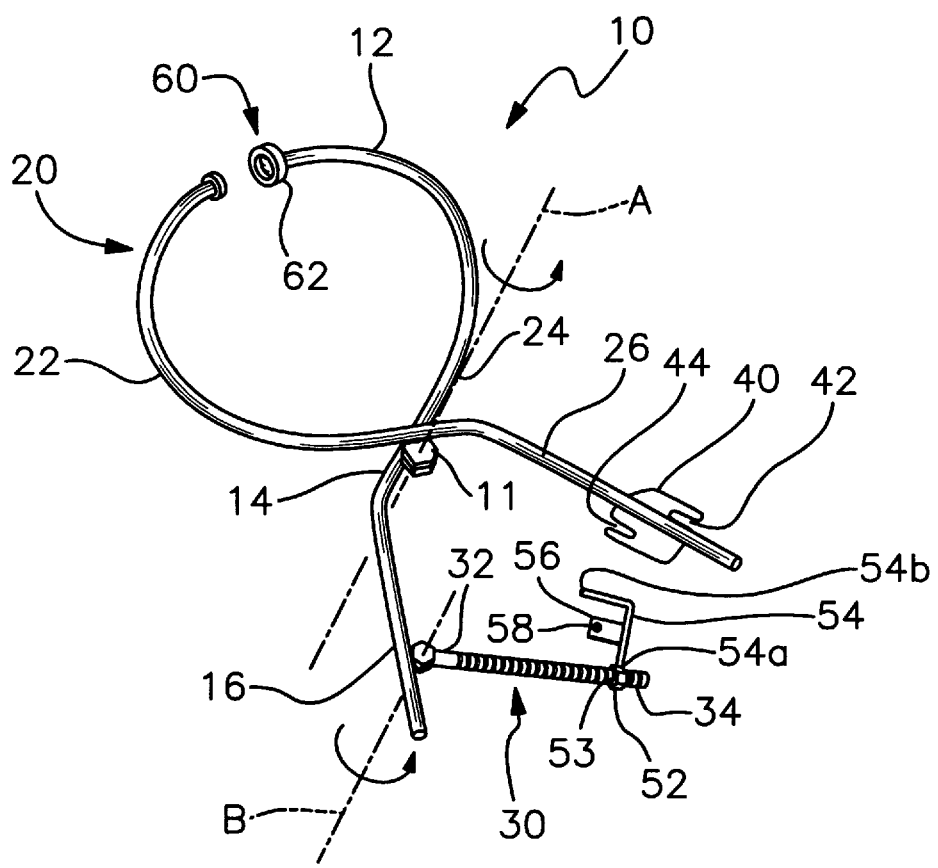
FIG. 1 is an elevated view in perspective of one embodiment of this invention.
Figure 2:
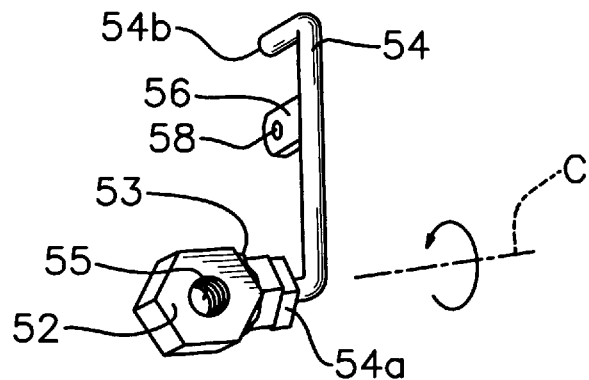
FIG. 2 is a view in perspective of the second flange member of the device of FIG. 1.

As may now be appreciated, the apparatus of this invention may be easily rigidly clamped to the wheel of a vehicle and easily removed by those who are authorized to unclamp the device, all without requiring the use of cumbersome, complicated locking mechanisms. With reference now to the drawings, FIG. 1 illustrates a preferred apparatus of this invention having a first arm 10, a second arm 20 and a cross bar 30. Arms 10 and 20 are comprised of respective arcuate clamping end portions 12 and 22, middle portions 14 and 24, and locking end portions 16 and 26. Arms 10 and 20 are rotatably connected to each other at their respective middle portions 14 and 24 by a pivot bolt 11 so that one arm rotates relative to the other arm about an axis A. Cross bar 30 has a connecting end portion 32 and a free end portion 34, connecting end portion 32 being rotatably connected to locking end portion 16 of arm 10, so that cross bar 30 may rotate relative to arm 10 about an axis B. In the preferred apparatus depicted, free end portion 34 is threaded. The apparatus further includes a first flange member 40 which defines a first notch 42 and a second notch 44. Also provided is a second flange member comprised of a tab in the form of a nut 52, an arm member 54 having a connecting end 54a and a free end 54b, and a flange portion 56 through which extends a lock aperture 58. Connecting end 54a is rotatably attached to an outer surface 53 of nut 52, whereby arm member 54 may rotate relative to nut 52 about an axis C as seen on FIG. 2.

Figure 3:
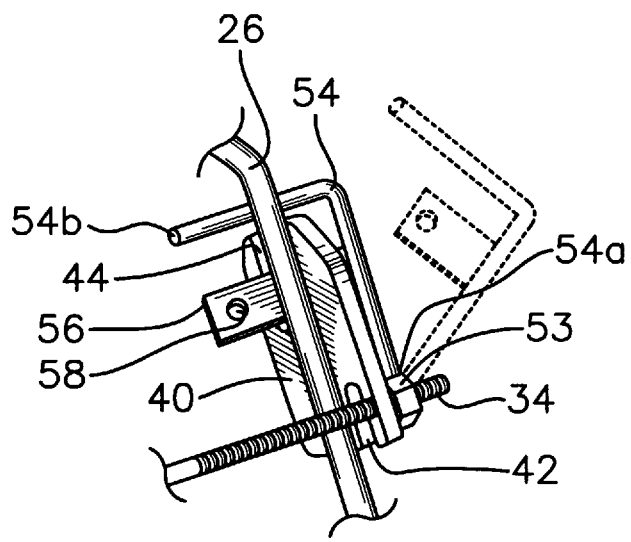
FIG. 3 is an elevated view in perspective of the connection between the first and second flange members and the cross bar of the device of FIG. 1 broken away, illustrating the movement of a portion of the second flange member in phantom lines.

FIG. 3 further illustrates with phantom lines the rotation of arm member 54 relative to nut 52 when placed on free end portion 34 of cross bar 30. Flange portion 56 extends laterally from arm member 54, and nut 52 defines and includes an internally threaded aperture 55 (FIG. 2 only) for receiving threaded free end portion 34.

Figure 4:
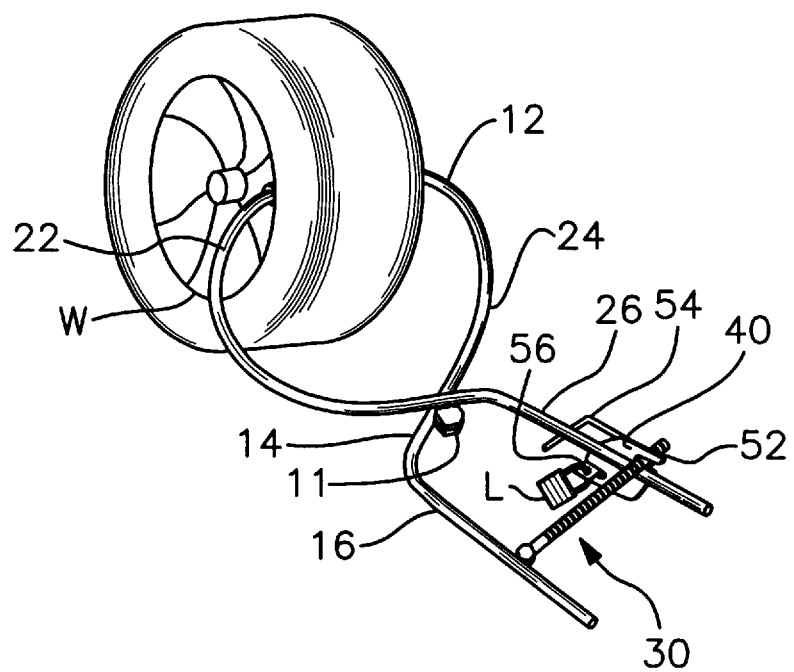
FIG. 4 is a perspective view of the device of FIG. 1 attached to a wheel.

Clamping end portions 12 and 22 are brought into proximity with one another when locking end portions 16 and 26 are brought into proximity with one another to thereby enable clamping of a wheel W, as seen in FIG. 4. When locking end portions 16 and 26 are brought into close proximity to one another, the first and second flange members and free end portion 34 of cross bar 30 may be locked together by a lock L to prevent others from unclamping the apparatus from wheel W. The flange members and the free end portion 34 may be locked together by placing the free end portion 34 in first notch 42 and attaching second flange member 50 to free end portion 34 to place second flange member 50 close enough to first flange member 40 to enable a lock to secure the flange members together. Preferably, prior to locking, second flange member 50 is detachable from free end portion 34 so that the individual components of the apparatus may be taken apart or replaced, if necessary.

As may be seen from the preferred apparatus depicted, a cup 60 formed from an annular flange 62 is disposed at the end of clamping end portion 12. Cup 60 is of sufficient depth and circumference to receive the end of clamping end portion 22 of arm 20 when the clamping ends of arms 10 and 20 are brought together. This feature of the apparatus prevents the clamping ends of the arms of the apparatus from being laterally wrenched apart, thereby further deterring would-be thieves from removing the apparatus from the wheel to which it is clamped.

The apparatus may be fabricated from a wide variety of rigid materials, including for example synthetic plastic composites, metals, metal alloys and the like, so long as the material is strong enough to substantially deter or prevent others from removing the device from the wheel to which it is clamped. The first and second arms of the device are typically solid tubular structures, but they are preferably square or rectangular in radial cross-section to provide added strength to the apparatus. In addition, as will be understood by those skilled in the art, a wide variety of locks may be used to secure the flange members together when the cross bar is in place, so long as the lock, by holding the flange members and the cross bar secure to one another, deters separation of the locking end portions of the arms to permit removal of the clamping end portions from the wheel being clamped.

This invention is susceptible to considerable variation in its practice. Therefore, the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

What is claimed is:

1. Apparatus for clamping a wheel of a wheeled vehicle to prevent or deter theft of the vehicle, the apparatus comprising:

a) a first arm and a second arm, each of the arms having a middle portion, a clamping end portion and a locking end portion, the arms being rotatably connected to each other at their respective middle portions;

b) a cross bar having a free end portion and a connecting end portion, the connecting end portion being rotatably connected to the locking end portion of the first arm;

c) a first flange member extending from the locking end portion of the second arm and defining and including a first notch for receiving the free end portion of the cross bar; and d) a second flange member detachably attachable to the free end portion of the cross bar; whereby the clamping end portions are brought into proximity with one another when the locking end portions are brought into proximity with one another to thereby enable clamping of the wheel, and whereby the first and second flange members and the free end portion of the cross bar can be locked together when (i) the free end portion is received by the first notch and (ii) the second flange member is attached to the free end portion of the cross bar and placed in close proximity to the first flange member.

2. Apparatus according to claim 1 wherein the free end portion of the cross bar is a threaded free end portion and wherein the second flange member is comprised of a tab defining and including an internally threaded aperture for receiving the threaded free end portion.

3. Apparatus according to claim 2 wherein at least one of the flange members has a lock aperture extending therethrough, whereby, when the free end portion of the cross bar is received in the first notch, the second flange member may threadably receive the free end portion of the cross bar and is disposed in proximity to the first flange member so as to enable a lock disposed through the lock aperture to secure the first and second flange members and the free end portion of the cross bar to one another.

4. Apparatus according to claim 3 wherein the second flange member is comprised of (i) a threaded nut having an outer surface, (ii) an arm member having a connecting end and a free end, the arm member being rotatably attached to the outer surface of the nut, at the connecting end, and (iii) a flange portion through which the lock aperture extends, the flange portion extending laterally from the arm member; and wherein the first flange member defines and includes a second notch to receive the flange portion of the second flange member when the second flange member is detachably attached to the threaded end portion of the cross bar and the arm member is rotated to place the flange portion in the second notch.

5. Apparatus according to claim 4 wherein the clamping end portions of the first and second arms meet at their respective clamping ends when the clamping end portions are brought together, the clamping end of one arm including a cup formed by an annular flange, the cup being sized and configured to receive the clamping end of the other arm when the clamping ends are brought together.

6. Apparatus according to claim 5 wherein the clamping end portions of the first and second arms are arcuate.

7. Apparatus according to claim 1 wherein the clamping end portions of the first and second arms are arcuate.

8. Apparatus according to claim 1 wherein the clamping end portions of the first and second arms meet at their respective clamping ends when the clamping end portions are brought together, the clamping end of one arm including a cup formed by an annular flange, the cup being sized and configured to receive the clamping end of the other arm when the clamping ends are brought together.

9. A method of preventing or deterring theft of a wheeled vehicle, the method comprising the steps of:
 a) clamping onto a wheel of the vehicle apparatus in accordance with claim 1;
 b) placing the free end portion of the cross bar in the first notch;
 c) attaching the second flange member to the free end portion of the cross bar; and
 d) locking together the first and second flange members and the free end portion of the cross bar.

\* \* \* \* \*